US011420271B2

(12) United States Patent
Boregowda et al.

(10) Patent No.: US 11,420,271 B2
(45) Date of Patent: Aug. 23, 2022

(54) ADAPTER SLEEVE AND CUTTING DEVICE

(71) Applicant: Kennametal Inc., Latrobe, PA (US)

(72) Inventors: Santhosha Borapura Boregowda, Karnataka (IN); Gururaj Bommagatti Hanumeshachar, Karnataka (IN); Josef Konrad Herud, Herzogenaurach (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/008,693

(22) Filed: Jun. 14, 2018

(65) Prior Publication Data

US 2018/0369931 A1  Dec. 27, 2018

(30) Foreign Application Priority Data

Jun. 22, 2017 (DE) .......................... 102017113891.9

(51) Int. Cl.
*B23B 31/30* (2006.01)
*B23B 31/20* (2006.01)

(52) U.S. Cl.
CPC .......... *B23B 31/305* (2013.01); *B23B 31/202* (2013.01); *B23B 2231/04* (2013.01); *B23B 2231/24* (2013.01); *B23B 2231/365* (2013.01)

(58) Field of Classification Search
CPC ..... B23B 31/102; B23B 31/305; B23B 51/12; B23B 2250/12; B23B 2231/04;
(Continued)

(56) References Cited

U.S. PATENT DOCUMENTS 4,213,354 A   7/1980   Dahinden
4,795,292 A * 1/1989   Dye ..................... B23Q 1/0036
                                                  279/20
(Continued)

FOREIGN PATENT DOCUMENTS

DE   202011004231 U1 * 8/2011 ........... B23B 31/201
DE   202012104969      2/2013
(Continued)

OTHER PUBLICATIONS

Oct. 6, 2017 Final Rejection.
(Continued)

*Primary Examiner* — Eric A. Gates
*Assistant Examiner* — Paul M Janeski
(74) *Attorney, Agent, or Firm* — Christopher J. Owens

(57) ABSTRACT

An adapter sleeve is described for inserting into an expansion chuck of a cutting device with a substantially cylindrical body that defines a longitudinal axis (L) of the adapter sleeve and a seat area for a cutting tool. The body comprises an axial front end and an axial rear end opposite the front end by means of which the adapter sleeve can be inserted into the expansion chuck of the cutting device. An outlet element is provided at the axial front end through which a coolant can be discharged toward the cutting tool. At least one cooling line extends along the body up to the outlet element and comprises a body line section and an outlet element section. At least one channel-like outlet nozzle is formed in the outlet element and is in fluidic connection with the at least one cooling line. The flow cross-section of the cooling line decreases or remains the same toward the axial front end. In addition, a cutting device is described.

20 Claims, 9 Drawing Sheets

(58) Field of Classification Search
CPC .............. B23B 2231/24; B23B 31/202; B23B 2260/026; B23B 2231/2091; B23Q 11/1023; Y10T 279/17111; Y10T 279/17435
See application file for complete search history.

(56) References Cited

U.S. PATENT DOCUMENTS

| | | | |
|---|---|---|---|
| 5,358,360 A * | 10/1994 | Mai .................... | B23Q 11/1084 408/61 |
| 5,405,155 A * | 4/1995 | Kanaan ................ | B23B 31/001 279/157 |
| 7,785,046 B2 | 8/2010 | Beckington | |
| 8,337,125 B2 | 12/2012 | Digernes et al. | |
| 2004/0613480 | 1/2004 | Beckington | |
| 2007/0077132 A1* | 4/2007 | Beckington ............. | B23B 31/02 408/61 |
| 2011/0103902 A1 | 5/2011 | Erickson | |
| 2011/0318123 A1 | 12/2011 | Leishman et al. | |
| 2012/0308323 A1 | 12/2012 | Gardner et al. | |
| 2014/0353931 A1* | 12/2014 | Frota de Souza Filho ................. | B23B 31/204 279/4.07 |
| 2015/0042050 A1 | 2/2015 | Haimer et al. | |
| 2016/0368064 A1 | 12/2016 | Boregowda et al. | |

FOREIGN PATENT DOCUMENTS

| | | | |
|---|---|---|---|
| DE | 102012101672 A1 | | 8/2013 |
| JP | 2002192441 A | * | 7/2002 |
| JP | 2003266274 A | * | 9/2003 |
| JP | 2004351552 A | * | 12/2004 |

OTHER PUBLICATIONS

Jan. 4, 2018 Office action (3 months).
Mar. 9, 2018 Office action (3 months).
Jun. 18, 2018 Final.
Oct. 13, 2020 Office Action (non-US) IN App. No. 1800CHE2014A.
Nov. 23, 2018 Notice of Allowance U.S. Appl. No. 10/252,346.
Aug. 16, 2018 Notice of Allowance U.S. Appl. No. 10/160,042.
Jan. 9, 2018 Advisory Action (PTOL-303) 1 U.S. Appl. No. 10/160,042.
Feb. 15, 2022 Office Action (non-US) IN App. No. 1800CHE2014A.

\* cited by examiner

ADAPTER SLEEVE AND CUTTING DEVICE

RELATED APPLICATION DATA

This application claims priority pursuant to 35 U.S.C. § 119(a) to German Patent Application No. 102017113891.9 filed Jun. 22, 2017, which is hereby incorporated by reference in its entirety.

FIELD

The invention relates to an adapter sleeve for inserting into an expansion chuck of a cutting device, as well as a cutting device.

BACKGROUND

Adapter sleeves are known from the prior art that are used with cutting devices in order to accommodate, for example, a cutting tool such as an end mill or a drill bit that has a small diameter. The adapter sleeve reduces the effective diameter for accommodating the cutting tool by inserting the adapter sleeve into the expansion chuck of the cutting device, wherein the cutting tool is in turn inserted into the adapter sleeve.

To cool the inserted cutting tool, it is known in the prior art that the adapter sleeve itself can have structures by means of which coolant is transported to the cutting tool. These structures can be coolant lines formed in the adapter sleeve that have a corresponding outlet nozzles at an end face that is oriented toward the cutting end of the cutting tool. While the cutting tool is operating, the coolant correspondingly exits the outlet nozzles and contacts the cutting tool such that it is effectively cooled during operation.

With the adapter sleeves known from the prior art, the outlet nozzles are subsequently introduced, e.g., drilled, into the adapter sleeve. The large amount of production effort has proven to be disadvantageous since an additional production step is needed to provide the coolant lines. It has also proven to be disadvantageous that the coolant supply to the cutting tool is not particularly efficient.

SUMMARY

The object of the invention is to provide an adapter sleeve that makes it possible to effectively cool the employed cutting tool in an economical manner by transporting the coolant efficiently to the cutting tool.

The object is achieved according to the invention with an adapter sleeve that is designed to be inserted into an expansion chuck of a cutting device with a substantially cylindrical body that defines a longitudinal axis of the adapter sleeve and a seat area for a cutting tool, wherein the body comprises an axial front end and an axial rear end opposite the front end by means of which the adapter sleeve can be inserted into the expansion chuck of the cutting device, wherein an outlet element is provided at the axial front end through which a coolant can be discharged toward the cutting tool, wherein at least one cooling line extends along the body up to the outlet element and comprises a body line section and an outlet element section, wherein at least one channel-like outlet nozzle is formed in the outlet element and is in fluidic connection with the at least one cooling line, and wherein the flow cross-section of the cooling line decreases or remains the same toward the axial front end.

The basic concept of the invention is to design the coolant supply to the cutting tool more efficiently such that the flow cross-section of the cooling line decreases toward the axial front end so that the flow speed of the coolant changes, especially increases, due to the changing flow cross-section, which makes the cooling of the cutting tool correspondingly more efficient. This can also be achieved when the flow cross-section of the cooling line remains the same, provided that the cooling line is specially designed, for example as a channel. In this context, the Venturi principle is used that establishes a relationship between the flow cross-section and flow speed. The cooling line moreover extends in particular through the substantially cylindrical body such that the cooling line starts in the region of the axial rear end and extends up to the outlet element, wherein this region is defined as the body line section. The outlet element is in particular designed integrally with the cylindrical body such that it forms the axial front end of the adapter sleeve.

One feature provides that the flow cross-section of the outlet nozzle is less than the flow cross section of the cooling line, in particular the body line section, and/or the outlet element section of the cooling line. The flow cross-section of the cooling line can accordingly change at different locations, for example within the body line section, in the outlet element section, or only at the outlet nozzle itself. In general, however, the cooling line has a greater flow cross-section in a region different than the outlet nozzle.

In particular, it is provided that the flow cross-section of the cooling line decreases continuously. Consequently, there is no step or ledge in the cooling line at which the coolant could accumulate.

Another feature provides that the cooling line comprises a cooling distribution section by means of which the coolant is distributed to a plurality of outlet nozzles, wherein at least two channel-like outlet nozzles are assigned to the cooling distribution section, in particular wherein the cooling distribution section only extends over a portion of the circumference of the body. With the cooling distribution section, it is possible to supply a plurality of exit nozzles from a common cooling line since the coolant flowing through the cooling line is distributed by the cooling distribution section to the outlet nozzles assigned to the cooling distribution section. For example, there are three exit nozzles per cooling line that are correspondingly supplied with coolant by the cooling distribution section.

According to another feature, the coolant distribution section is arranged between the body line section and the outlet element section, in particular wherein the cooling distribution section extends substantially perpendicular to the assigned cooling line. The cooling distribution section accordingly represents the interface between the body line section and the outlet element section such that coolant flowing through the cooling line, in particular the body line section, is distributed to the correspondingly assigned outlet nozzles that are provided in the outlet element section.

The outlet element is for example an end section of the adapter sleeve designed in the shape of a disk that has an enlarged diameter relative to the cylindrical body such that the cooling distribution section can be easily formed in this transitional region in order to supply the plurality of outlet nozzles that are assigned to a body line section with the coolant.

The outlet element that is designed in the shape of a disk represents in particular an axial stop by means of which the adapter sleeve can be inserted into the expansion chuck of the cutting device.

In particular, a plurality of cooling lines is provided that is evenly distributed over the perimeter of the body, wherein each of the plurality of outlet nozzles is assigned to each of the plurality of cooling lines, in particular three outlet nozzles per cooling line. This ensures that the cutting tool inserted into the adapter sleeve can be homogeneously supplied with coolant since coolant is distributed over its perimeter. The plurality of outlet nozzles per cooling line ensures that there is fine and homogeneously distributed cooling of the cutting tool.

According to one embodiment, the body line section of the cooling line is designed as a cooling channel in the body. This means that the cooling line, in particular the body line section of the cooling line, is designed as an annular closed channel which is accordingly embedded in the body. The cooling line consequently cannot be seen from the outside (except for the ends).

According to another embodiment, the body line section of the cooling line is designed as a groove in the outer surface of the body. Accordingly, the body line section is designed open radially toward the outside, wherein the body line section is bordered radially to the outside by the cutting device, in particular the expansion chuck into which the adapter sleeve is inserted when the adapter sleeve is inserted in the cutting device. Consequently, this yields a channel-like structure for the body line section as well, provided that the adapter sleeve is inserted into the cutting device. The edges of the channel-like structure are only formed by the outer surface of the body and the cutting device. The groove in the outer surface of the body can generally also be termed a recess.

Another feature provides a plurality of outlet nozzles that is arranged along a circular line on the front end face of the body, and/or each have a circular outlet opening. This allows coolant to homogeneously contact the cutting tool so that it is efficiently cooled.

According to another feature, the outlet nozzle is arranged in the outlet element such that an outlet axis of the outlet nozzle has an angle essentially between 1° and 45° relative to the longitudinal axis of the body, in particular between 3° and 30°. The coolant exits at an angle relative to the longitudinal axis of the body, i.e., the mid-axis of the body, which ensures that the coolant is directed toward the cutting tool. The exiting coolant accordingly contacts the tip of the cutting tool which is in contact with a workpiece to be machined, wherein the tip is correspondingly cooled effectively.

Moreover, the body can have, at least sectionally, a peripheral bead in the region of the axial rear end and at a distance from the rear end face, wherein the bead has a reduced diameter. The adapter sleeve can be easily threaded into the cutting device over the bead since the bead has a reduced diameter than the body. This means that the adapter sleeve can also be inserted at a slight angular offset into the cutting tool, wherein the adapter sleeve then essentially aligns by itself when it is inserted further into the cutting tool. The adapters sleeve can be correspondingly inserted more easily into the cutting tool.

In particular, an inner thread is formed in the axial rear end by means of which a length adjustment screw can be screwed in. The length adjustment screw represents a connection between the cutting device and adapter sleeve by means of which the axial length can be adjusted since the adapter sleeve therefore does not have to be inserted into the expansion chuck of the cutting device up to an axial stop.

According to another feature, at least one continuous slot is formed in the body that extends parallel to the longitudinal axis and/or up to the axial front end of the adapter sleeve, in particular up to the front end face. The slot ensures that the adapter sleeve can be correspondingly adjusted in a radial direction, for example by the expansion chuck into which the adapter sleeve is inserted. This allows a clamping force to be exerted on a cutting tool inserted into the adapter sleeve via the expansion chuck and the intermediate adapter sleeve without the adapter sleeve being damaged. The diameter of the adapter sleeve is correspondingly reduced by the expansion chuck, provided that a force which is directed radially inward is exerted on the adapter sleeve.

Another feature provides that the body is designed as a single piece, wherein the outlet nozzles and/or the at least one cooling line are/is designed without drilling, in particular wherein the outlet nozzles and/or the at least one cooling line have or has been formed during the production of the body, preferably wherein the body has been produced in a three-dimensional printing method and in particular is made of 1.2343 or 1.2344 metal powder. This accordingly allows the adapter sleeve to be economically produced, in particular the decreasing flow cross-sections of the at least one cooling line. Furthermore, the subsequent production step is discarded in which the cooling line is introduced into the already produced body since the cooling must already be introduced during the production of the body. It is easily and economically possible to produce the adapter sleeve by means of the 3-D printing method, wherein this is done with a corresponding metal powder that has the necessary properties. In particular the body produced with the metal powder in a 3-D printing method has the required properties in terms of stiffness and strength.

Furthermore, the object is achieved according to the invention with a cutting device having an adapter sleeve of the aforementioned type. The aforementioned advantages of the adapter sleeve analogously result for the cutting device that comprises a corresponding adapter sleeve.

One feature provides that the cutting device has a seat section into which the adapter sleeve is inserted, wherein a length adjustment screw is provided that is coupled to the cutting device and adapter sleeve, in particular to the inner thread in the axial rear end of the body. The axial length of the cutting device can be adjusted by the length adjustment screw since the adapter sleeve can correspondingly be adjusted by the length adjustment screw axially to the front with reference to the cutting device, in particular the seat section, which yields a greater axial length of the overall cutting device, in particular the cutting tool inserted into the cutting device.

Another feature provides that the adapter sleeve, by a stop surface of the outlet element opposite the front end face, lies directly on a mating surface of the seat section, in particular without a sealing ring. The outlet element forms the stop surface by means of which the adapter sleeve lies against the seat section of the cutting device in a form fit. The expansion chuck is in particular a hydraulic chuck.

Further advantages and properties of the invention will be apparent from the following description and the drawings being referenced. In the drawings:

DETAILED DESCRIPTION

Figure 1:
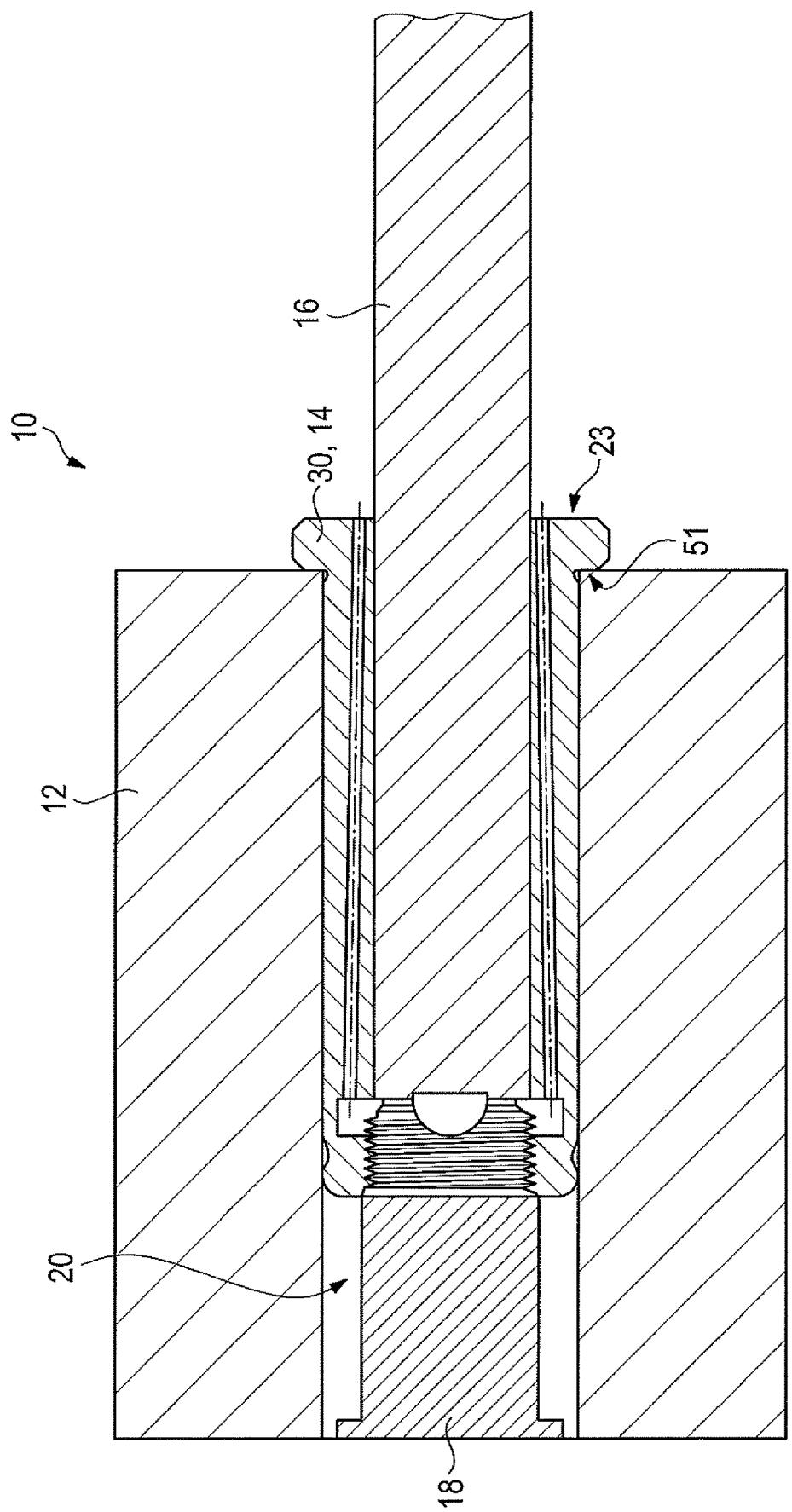
FIG. 1 shows a schematic sectional representation of a cutting device according to the invention with an adapter sleeve according to the invention.

FIG. 1 shows a cutting device 10 that comprises an expansion chuck 12 in which an adapter sleeve 14 is accommodated. A cutting tool 16 is accommodated in the adapter sleeve 14 such that the adapter sleeve 14 is arranged between the expansion chuck 12 of the cutting device 10 and the cutting tool 16. The cutting tool 16 is, for example, a drill bit.

Moreover, the cutting device 10 in the shown embodiment comprises an optional length adjustment screw 18 by means of which the axial position of the adapter sleeve 14 can be adjusted within the expansion chuck 12, which has a corresponding seat section 20 in which the adapter sleeve 14 is accommodated.

The adapter sleeve 14 portrayed in FIG. 1 will be explained below in detail with reference to FIG. 2 to 5, and different embodiments will be presented.

Figure 2A:
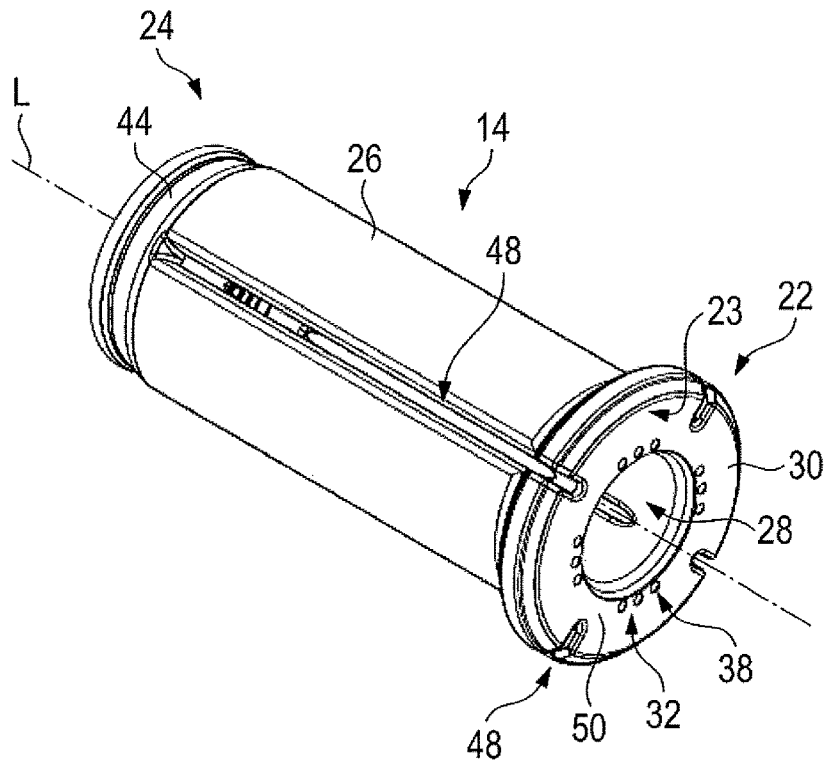
FIG. 2a to 2e show a representation of an adapter sleeve according to the invention according to a first embodiment.
Figure 2B:
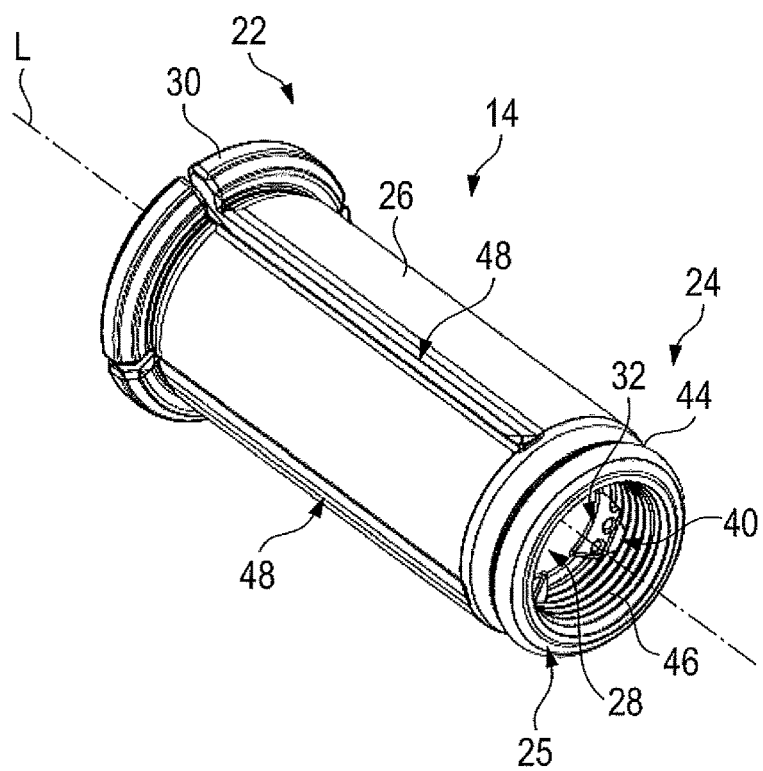
Figure 2C:
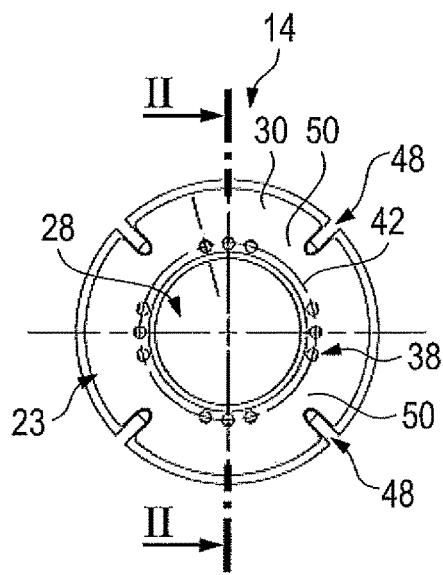
Figure 2D:
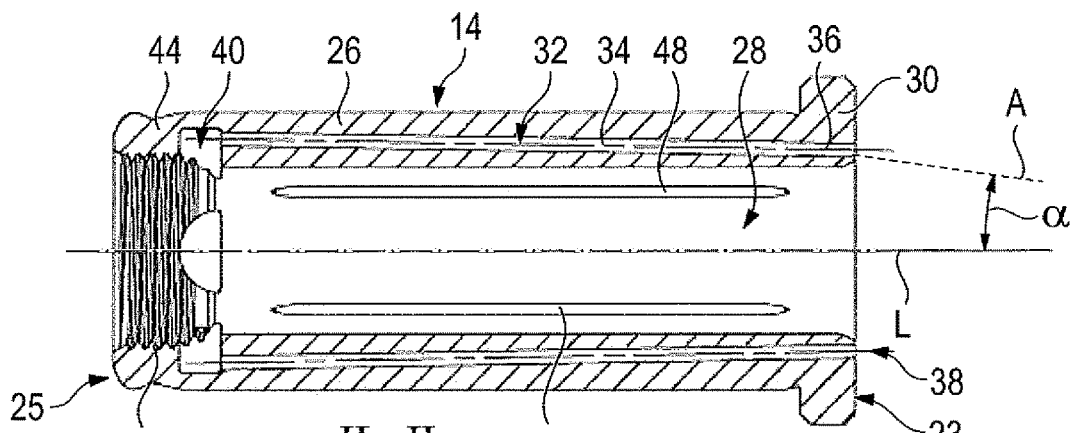
Figure 2E:
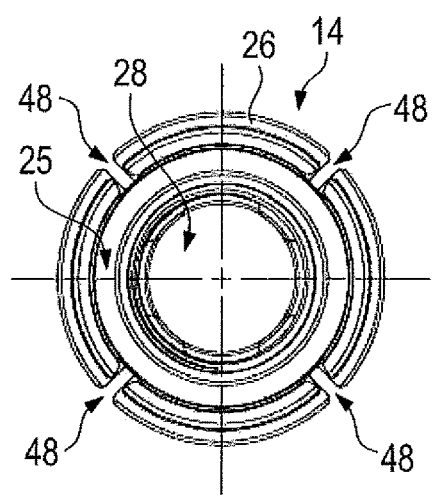

FIG. 2a to 2e depicts the adapter sleeve 14 according to first embodiment in two different perspective views (FIGS. 2a and 2b) as well as a front view (FIG. 2c), a longitudinal section (FIG. 2d), and a rear view (FIG. 2e).

The adapter sleeve 14 has an axial front end 22 with a front end face 23, as well as an axial rear end 24 with a rear end face 25 opposite the front end 22. The front end 22 and the rear end 24 are each provided on a substantially cylindrical body 26 that defines a longitudinal axis L of the adapter sleeve 14. Moreover, the cylindrical body 26 forms a seat area 28 for the cutting tool 16, wherein the seat area 28 is defined by the wall of the cylindrical body 26, in particular in the radial direction.

In addition, FIG. 2 reveals that the adapter sleeve 14 has an outlet element 30 on the axial front end 22 that faces away from the cutting device 10 in an inserted state, in particular faces the active end of the cutting tool 16. A coolant can be discharged through the outlet element 30 towards the corresponding cutting tool 16 inserted in the adapter sleeve 14, wherein at least one cooling line 32 is provided for this in the adapter sleeve 14 and extends up to the outlet element 30.

The cooling line 32 comprises a body line section 34 which is embedded in the body 26 in the depicted embodiment and extends from the axial rear end 24 up to the axial front end 22 as revealed in FIG. 2d. Moreover, the cooling line 32 comprises an outlet element section 36 that is provided in the outlet element 30. The outlet element section 36 transitions into a channel-like outlet nozzle 38 which is provided on the front end face 23 of the adapter sleeve 14 that is formed by the surface of the outlet element 30 facing away from the cylindrical body 26.

The channel-like outlet nozzle 38 is accordingly in fluidic connection with the cooling line 32 such that the coolant can exit the outlet nozzle 38 in order to act on the cutting tool 16 inserted into the adapter sleeve 14.

Moreover, FIG. 2a to 2e reveal that the cooling line 32 comprises a cooling distribution section 40 that, in the depicted embodiment, is provided at the beginning of the body line section 34 (see FIGS. 2b and 2d) such that the coolant supplied to the adapter sleeve 14 is already distributed in the cylindrical body 26 to a plurality of body line sections 34, in particular three body line sections 34, that are assigned to a cooling line 32. Accordingly, corresponding the number of cooling line sections 34 per cooling line 32, three outlet nozzles 38 are provided in the outlet element 30 and are each fluidically connected to the body line sections 34.

As revealed in FIG. 2b, the cooling distribution section 40 only extends over a portion of the perimeter of the body 26, wherein the cooling distribution section 40 is aligned substantially perpendicular to the assigned cooling line 32. The cooling line 32 extends along the longitudinal axis L, whereas the cooling distribution section 40 extends in a peripheral direction, i.e., substantially perpendicular to the longitudinal axis L.

As shown in FIGS. 2b and 2d, the cooling distribution section 40 is designed as an elongated slot that extends substantially perpendicular to the longitudinal axis L, or the main direction of the cooling line 32.

FIG. 2A to 2e also reveal that the adapter sleeve 14 comprises a total of four cooling lines 32, each of which comprises three body line sections 34 as well as three outlet element sections 36 which are fluidically connected to three channel-like outlet nozzles 38.

The body line sections 34 are each designed as cooling channels in the body 26, i.e., embedded in the body 26.

In general, the plurality of cooling lines 32 extends evenly over the perimeter of the body 26 so that the assigned outlet nozzles 38 are also arranged substantially symmetrically on the outlet element 30. This yields a homogeneous cooling of the cutting tool 18.

Moreover, in particular FIG. 2a and FIG. 2d reveal that the outlet nozzles 38 extend along a circular line 42 on the front end face 23 of the body 26, in particular the outlet element 30. The outlet nozzles 38 themselves also have a circular geometry.

Furthermore, the outlet nozzles 38 are arranged on the outlet element 30 such that the outlet nozzles 38 each have an outlet axis A that has an angle α relative to the longitudinal axis L of the body 26 which is between 1° and 45°, in particular between 3° and 30°. This ensures that the coolant flowing out of the outlet nozzles 38 is directed toward the cutting tool 16 extending along the longitudinal axis L of the body 26, in particular the tip of the cutting tool 16.

Moreover, the cooling line 32 can generally have a decreasing flow cross-section that decreases toward the axially front end 22 of the adapter sleeve 14. In the shown embodiment, this is for example guaranteed by the flow cross-section correspondingly decreasing over the cooling distribution section 40 in that the respective body line sections 34 have a smaller flow cross-section than the cooling line 32 before the cooling distribution section 40. This ensures that the flow speed of the coolant that flows over the respective body line section 34 is increased since the flow cross-section is correspondingly decreased. The body line sections 34 themselves can have an unchanging flow cross-section that in particular corresponds to that of the outlet nozzles 38.

Alternatively or in addition, it can be provided that the flow cross-section of each body line section 34 also decreases in the direction of the axial front end 22. Furthermore, it can be provided that the flow cross-section decreases in the respective outlet element section 36 in the direction of the axial front end 22, or the flow cross-section of the outlet nozzles 38 is correspondingly reduced.

Generally, this ensures that the flow speed of the coolant increases toward the outlet nozzles 38 which yields an efficient cooling of the cutting tool 16.

Moreover, FIG. 2a to 2e reveal that the body 26 comprises a bead 44 in the region of the axial rear end 24 that is formed peripherally and has a smaller diameter in comparison to the body 26. The bead 44 is provided on the body 26 at a distance from the rear end face 25. The bead 44 ensures that the adapter sleeve 14 can be easily threaded into the expansion chuck 12 of the cutting device 10 since the diameter in the region of the axial rear end 24 is correspondingly somewhat reduced.

Furthermore, an inner thread 46 is provided in the region of the axial rear end 24 by means of which the adapter sleeve 14 can be coupled to the length adjustment screw 18 (see FIG. 1), whereby the adapter sleeve 14 can be correspondingly adjusted in the cutting device 10 in an axial direction. This allows the cutting tool 16 accommodated in the adapter sleeve 14 to be axially adjusted, in particular including the adapter sleeve 14.

In the shown embodiment, the adapter sleeve 14 moreover comprises four continuous slots 48 that are provided in the body 26 and extend parallel to the longitudinal axis L. The continuous slots 48 extend up to the axial front end 22, in particular up to the corresponding end face 23 on the outlet element 20. The slots 48 ensure that the adapter sleeve 14 can correspondingly change its diameter provided that the expansion chuck 12 contracts, and pressure is exerted on the adapter sleeve 14, whereby the cutting tool 16 accommodated in the adapter sleeve 14 can be clamped.

As revealed by FIG. 2a to 2e, the outlet element 30 has bars 50 that ensure that a continuous front end face 23 exists on the outlet element 30 in order to achieve the required stability of the adapter sleeve 14.

In particular, the adapter sleeve 14 is designed as a single piece, i.e., the body 26 including the outlet element 30, wherein the outlet nozzles 38 as well as the entire cooling line 32 are formed without drilling. The outlet nozzles 38 as well as the cooling line 32 are correspondingly formed during the production of the body 26 or the adapter sleeve 14, for example during a three-dimensional printing process.

Accordingly, the adapter sleeve 14 can be produced from a metal powder such as the metal powder 1.2343 or 1.2344.

It can be provided that the flow cross-section of the outlet nozzles 38 is less than that of the cooling line 32 so that it produces a corresponding change in the flow speed of the coolant. For example, the flow cross-section of the outlet nozzles 38 is smaller than that of the body line section 34, or the outlet element section 36.

FIG. 1 furthermore reveals that the outlet element 30 has a stop surface 51 opposite the front end face 23 that interacts with a mating surface of the expansion chuck 12, in particular the seat section 20, in order to form an axial stop. Since the adapter sleeve 14, via the stop surface 51, lies directly against the corresponding mating surface and the cooling line 32 is sealed to the outside at least in the outlet element section 36, a seal is not required. The corresponding cutting device 10 is therefore designed without a sealing ring in the region of the adapter sleeve 14.

FIG. 3a to 3e show a second embodiment of the adapter sleeve 14 in views that are analogous to the first embodiment.

The second embodiment differs from the embodiment shown in FIG. 2a to 2e such that the cooling line 32, in particular the body line sections 34, are not embedded in the cylindrical body 26; rather, the body line sections 34 are formed as a groove 52 in the outer surface 54 of the body 26. This can also be termed a recess.

The corresponding grooves 52 interact with the inner surface of the expansion chuck 12 into which the adapter sleeve 14 is inserted in order to form a final cooling channel.

If, according to the second embodiment, the adapter sleeve 14 is inserted into the expansion chuck 12 of the cutting device 10, the inside of the seat section 20 of the expansion chuck 12 seals the grooves 52 of the adapter sleeve 14 that are radially open to the outside in order to form a cooling channel that is closed radially to the outside.

Figure 3A:
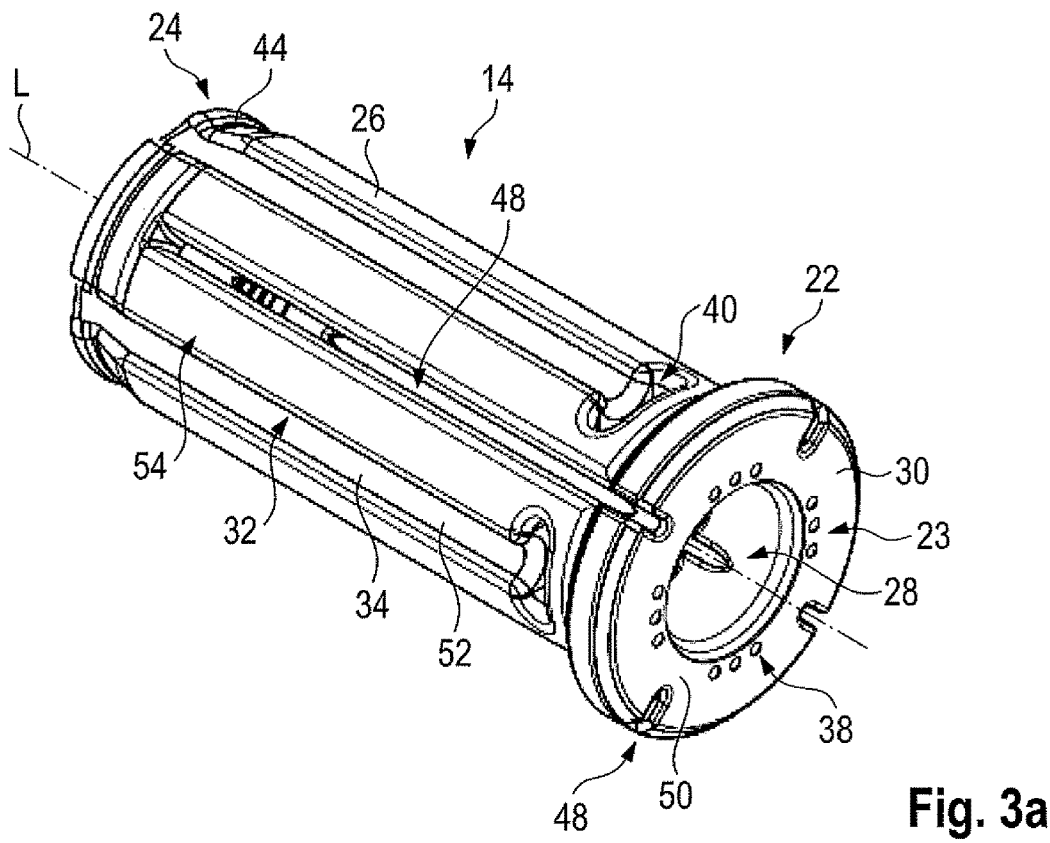
FIG. 3a to 3e show a representation of an adapter sleeve according to the invention according to a second embodiment.
Figure 3B:
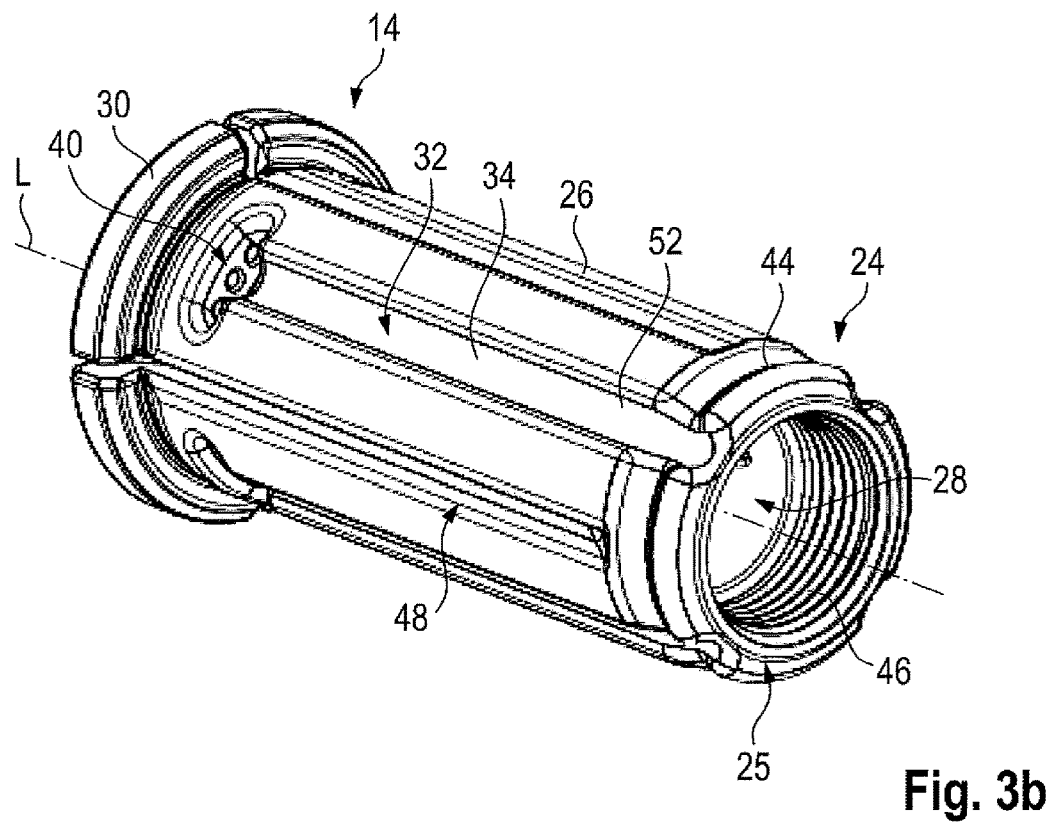
Figure 3C:
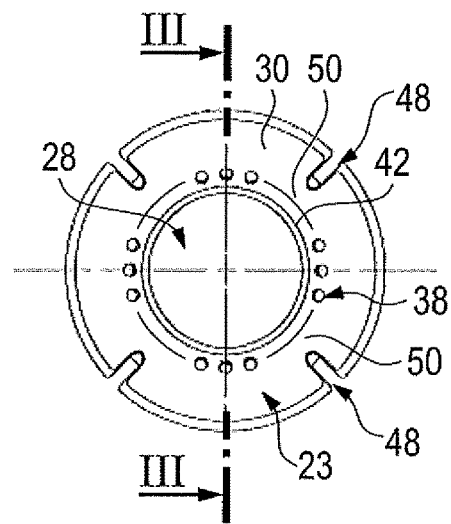
Figure 3D:
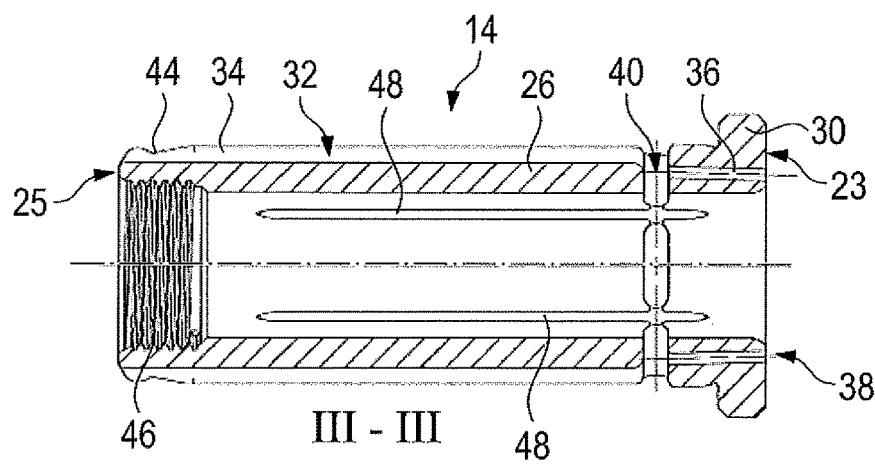
Figure 3E:
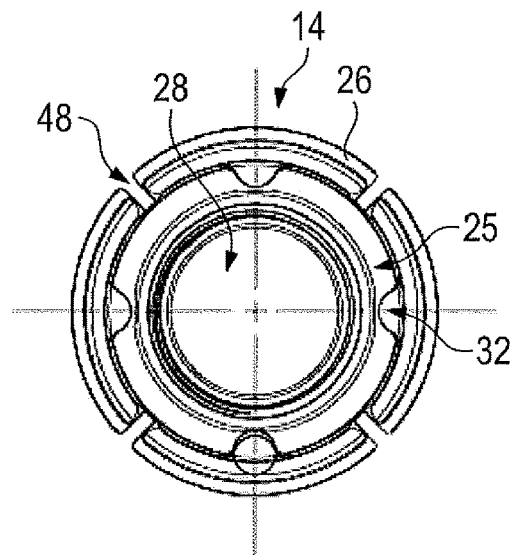
Figure 4A:
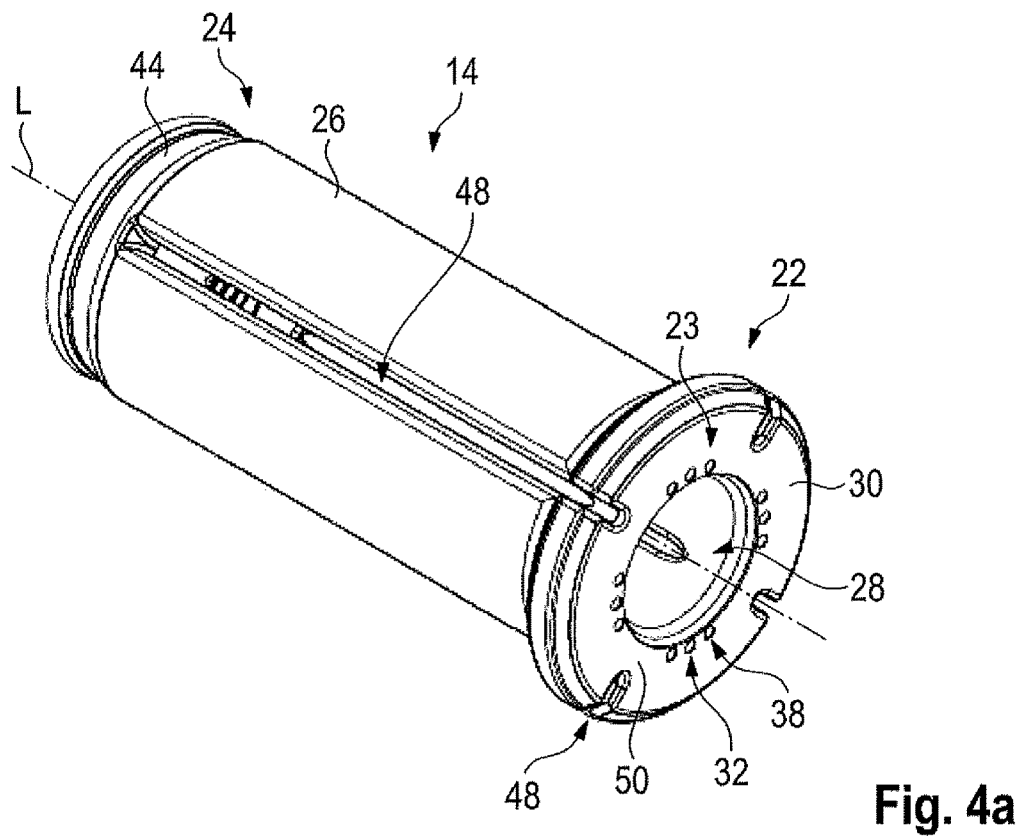
FIG. 4a to 4e show a representation of an adapter sleeve according to the invention according to a third embodiment.
Figure 4B:
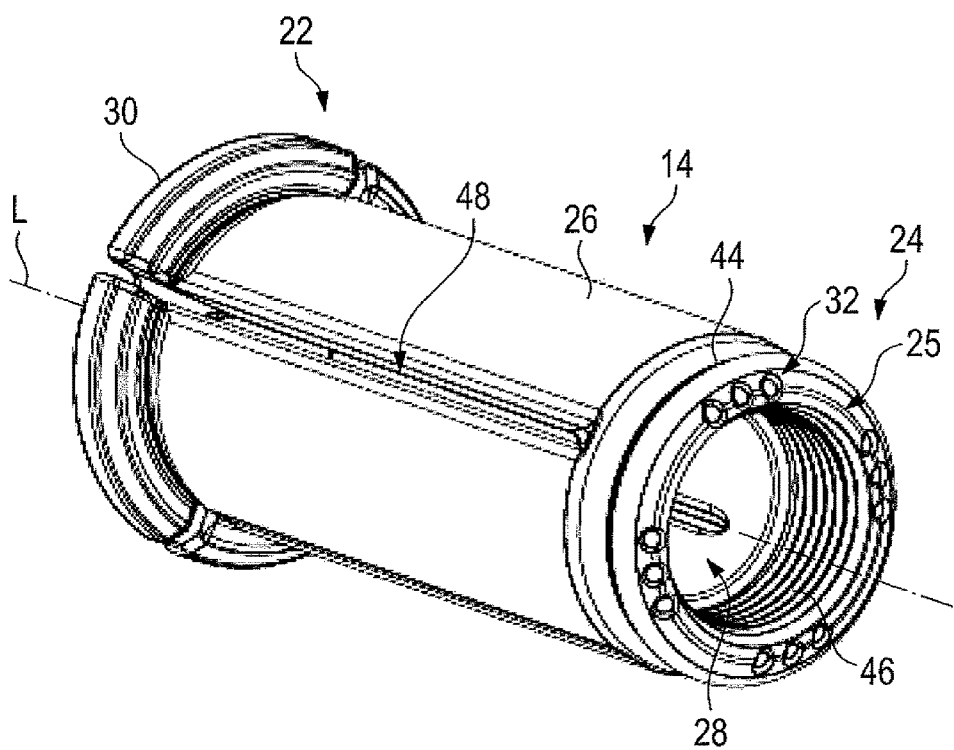
Figure 4C:
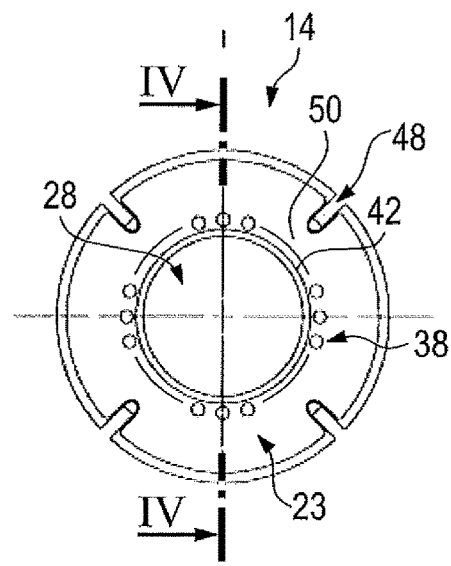
Figure 4D:
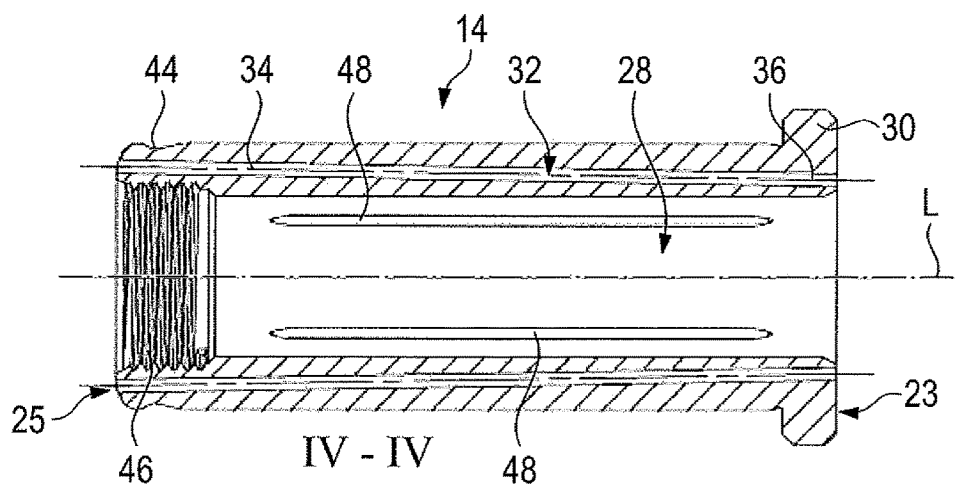
Figure 4E:
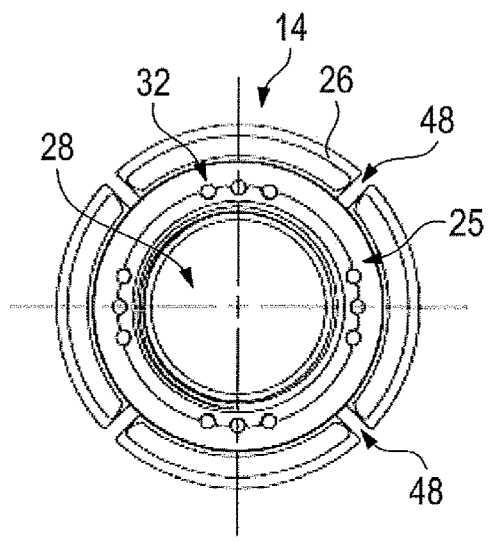
Figure 5A:
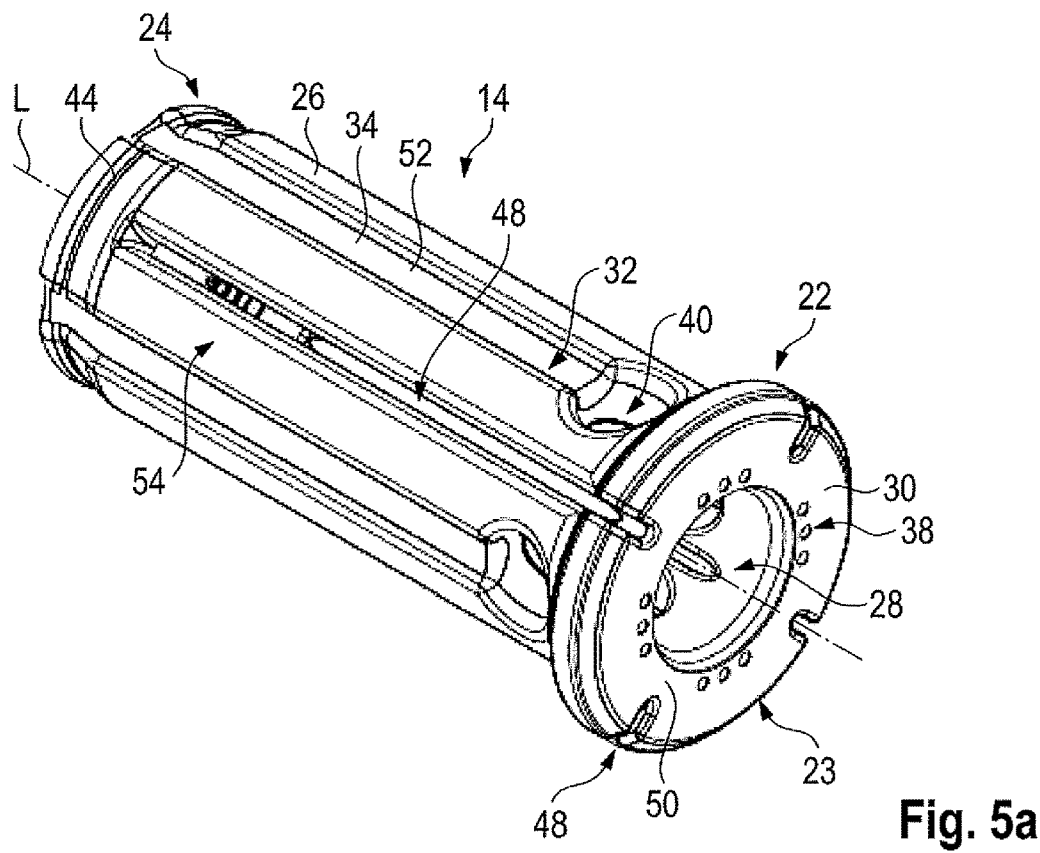
FIG. 5a to 5e show representations of an adapter sleeve according to the invention according to a fourth embodiment.
Figure 5B:
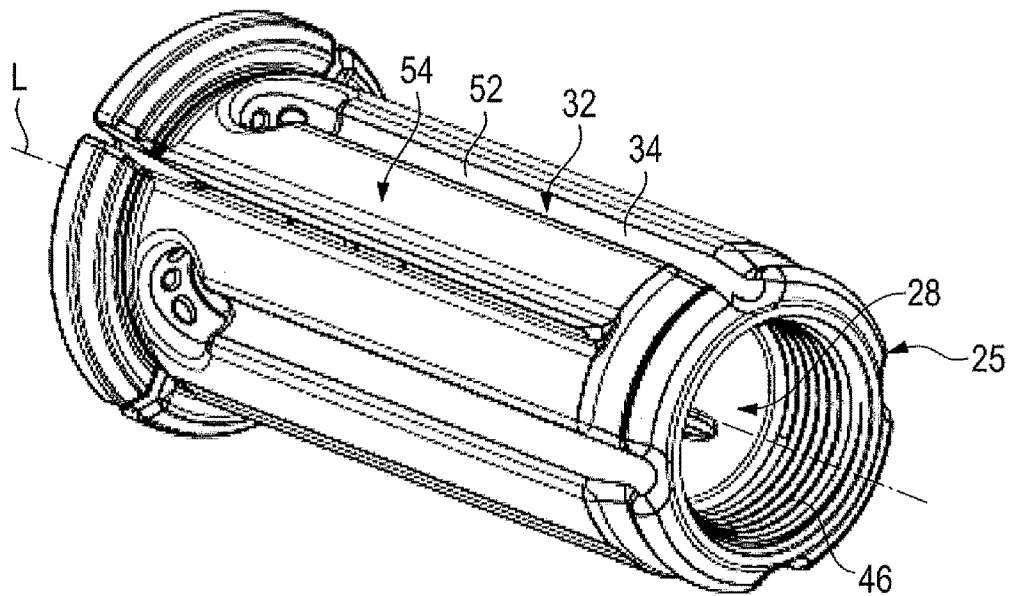
Figure 5C:
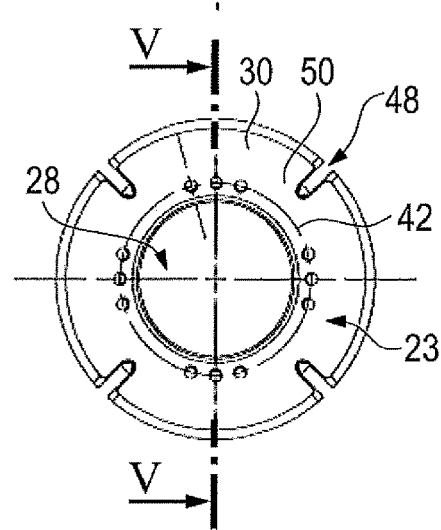
Figure 5D:
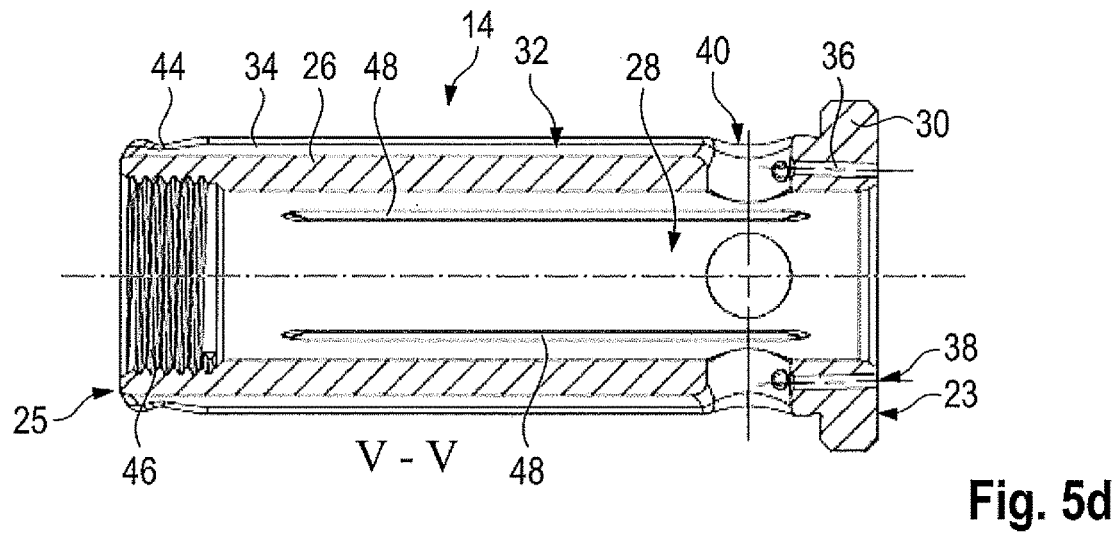
Figure 5E:
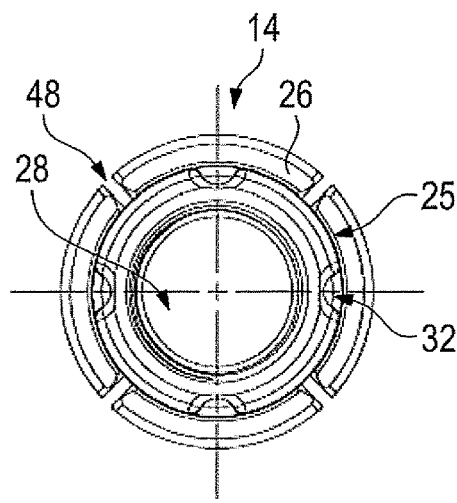

Furthermore, in the shown embodiment the respective cooling distribution section 40 is arranged between the body line section 34 and the outlet element section 36 as revealed by the corresponding figures, in particular FIGS. 3a, 3b and 3d. By means of the cooling distribution section 40, the supplied coolant is distributed to a plurality of outlet nozzles 38 assigned to the corresponding cooling distribution section 40 through which the coolant can then exit the adapter sleeve 14.

The coolant distribution section 40 extends over a section of the perimeter of the body 26 as revealed in FIG. 3a, in particular over a peripheral section that corresponds substantially to that of the assigned outlets nozzles 38. Since the coolant distribution section 40 extends partially over the perimeter of the body 26, it extends substantially perpendicular to the assigned coolant line 32 as also shown in FIG. 3a.

The flow cross-section of the coolant line 32 accordingly decreases between the body line section 34 and the outlet element section 36, i.e., in the region of the cooling distribution section 40.

Alternatively or in addition, it can be provided that the flow cross-section of the cooling line 32 also decreases in the outlet element section 36.

In general, this ensures that the flow cross-section of the cooling line 32 decreases toward the axial front end 22 in comparison to the flow cross-section at the axial rear end 24.

FIG. 4a to 4e show a third embodiment of the adapter sleeve 14 that differs from the two aforementioned embodiments in that a cooling distribution section 40 is not provided.

Instead, the cooling line 32 extends continuously from the end face 25 assigned to the axial rear end 24 up to the end face 23 assigned to the axial front end face 22. Accordingly, the cooling line 32 extends continuously through the body 26, in particular the entire adapter sleeve 14.

The flow cross-section of the cooling line 32 can decrease in that there is a continuous reduction of the flow cross-section. Accordingly, the flow cross-section of the cooling line 32 in the region of the axial rear end 24 is bigger than in the region of the axial front end 22.

This is possible in production since the corresponding cooling line 32 is produced during production of the adapter sleeve 14, i.e., for example in 3-D printing. Accordingly, the cooling line 32 does not have to be subsequently introduced, for example drilled, whereby it would be (almost) technically impossible to obtain a diameter that correspondingly changes continuously.

As already explained with reference to the embodiment according to FIG. 2a to 2e, both the body line section 34 as well as the outlet element section 36 are embedded in the corresponding body, or respectively outlet element 30 since they are enclosed by the corresponding material of the body 26. The cooling line 32 is thus embedded in the body 26 so that it cannot be seen from the outside, apart from the ends in the respective end faces 23, 25.

Alternatively, the flow cross-section of the body line section 34 formed as a cooling channel can, however, also be constant.

FIG. 5a to 5e show a fourth embodiment of the adapter sleeve 14 that differs from the aforementioned embodiments in that the cooling distribution section 40 is formed by a hole that was introduced into the body 26 substantially perpendicular to the longitudinal axis L of the adapter sleeve 14. The hole is in particular continuous through the body 26 as revealed by FIG. 5*d* such that two cooling distribution sections 40 can be produced simultaneously.

Analogous to the second embodiment that is shown in FIG. 3*a* to 3*e*, the cooling distribution section 40 is provided between the body line section 34 and outlet element section 36 of the respective cooling line 32 to yield a corresponding reduction in the flow cross-section of the cooling line 32 between the two cited sections 34, 36.

Also as in the second embodiment, the body line section 34 is formed as a groove 52 in the corresponding outer surface 54. The groove 52 then interacts with the inside of the expansion chuck 12 in order to form the cooling channel sealed to the outside.

With regard to the different embodiments, only the differences will be addressed since the other features are correspondingly transferable.

As in particular revealed from the front views of the respective embodiments, the outlet elements 30 are designed substantially the same. In particular, the outlet elements 30 and the body 26 are designed integral with each other, e.g., produced together in a 3-D printing process.

Due to the (at least optionally) changing flow cross-section of the cooling line 32, it is generally ensured in all the embodiments that efficient cooling of the cutting tool 16 is possible since the coolant has a greater speed at the exit nozzles 38 due to the Venturi principle associated with the flow cross-section, and more effective cooling is therefore possible.

In general, different geometries of the cooling lines 32 can be provided such as triangular cross-sections, conical cross-sections, or the like.

In general, the flow cross-section of the cooling line 32 can be designed in each embodiment such that it decreases continuously since the adapter sleeve 14 has been produced in a 3-D printing method to correspondingly make this possible. Consequently, the flow cross-section of the cooling line 32 in the region of the axial rear end 24 is bigger than in the region of the axial front end 22.

Due to the 3-D printing method used for production, it is also possible to design the body line sections 34 as cooling channels embedded in the body 26, in particular without reworking the adapter sleeve 14.

Alternative to the length adjustment screw 18, a plug can be screwed into the inner thread 46 such that the cooling lines can also be closed by the adapter sleeve 14. The cutting tool 16 would then only be cooled by the outer cooling lines provided in the cutting device 10, which is also termed outer cooling.

The invention claimed is:

1. An adapter sleeve for inserting into an expansion chuck of a cutting device, the adapter sleeve comprising:
a substantially cylindrical body that defines a longitudinal axis (L) of the adapter sleeve and a seat area for a cutting tool; and
a flange portion;
wherein the body comprises an axial front end and an axial rear end opposite the front end by means of which the adapter sleeve can be inserted into the expansion chuck of the cutting device, with the flange portion being disposed at the axial front end,
wherein an outlet element is provided at the axial front end through which a coolant can be discharged toward the cutting tool,
wherein at least one cooling line extends along the body up to the outlet element and comprises a body line section and an outlet element section, wherein at least one channel-like outlet nozzle is formed in a front end face of the outlet element and is in fluidic connection with the outlet element section of the at least one cooling line, wherein at least a portion of the outlet element section of the cooling line is enclosed by and embedded in the body and extends from the outlet element axially rearward of the flange portion of the adapter sleeve, and
wherein the flow cross-section of the cooling line decreases or remains the same toward the axial front end, and wherein the flow cross-section of the at least one channel-like outlet nozzle is less than the flow cross section of the cooling line, and
wherein a plurality of cooling lines are provided that are evenly distributed over the perimeter of the body, and wherein one of the at least one channel-like outlet nozzles is assigned to each of the plurality of cooling lines.

2. The adapter sleeve according to claim 1, characterized in that the cooling line comprises a cooling distribution section by means of which the coolant is distributed to a plurality of outlet nozzles, wherein at least two channel-like outlet nozzles are assigned to the cooling distribution section, in particular wherein the cooling distribution section only extends over a portion of the circumference of the body.

3. The adapter sleeve according to claim 2, characterized in that the coolant distribution section is arranged between the body line section and the outlet element section.

4. The adapter sleeve according to claim 1, wherein the body line section of the cooling line is designed as a cooling channel in the body.

5. The adapter sleeve according to claim 1, characterized in that the body line section of the cooling line is designed as a groove in the outer surface of the body.

6. The adapter sleeve according to claim 1, wherein a plurality of outlet nozzles is provided that is arranged along a circular line on the front end face of the body, and/or each have a circular outlet opening.

7. The adapter sleeve according to claim 1, wherein the outlet nozzle is arranged in the outlet element such that an outlet axis (A) of the outlet nozzle has an angle (a) essentially between 1° and 45° relative to the longitudinal axis (L) of the body.

8. The adapter sleeve according to claim 7, wherein the angle (a is between 3° and 30°.

9. The adapter sleeve according to claim 1, wherein the body has, at least sectionally, a peripheral bead in the region of the axial rear end and at a distance from the rear end face, wherein the bead has a smaller diameter.

10. The adapter sleeve according to claim 1, wherein an inner thread is formed in the axial rear end by means of which a length adjustment screw can be screwed in.

11. The adapter sleeve according to claim 1, wherein at least one continuous slot is formed in the body that extends parallel to the longitudinal axis (L) and/or up to the axial front end of the adapter sleeve.

12. The adapter sleeve according to claim 11, wherein the at least one continuous slot extends up to the front end face.

13. The adapter sleeve according to claim 1, wherein the body is designed as a single piece, wherein the outlet nozzles and/or the at least one cooling line are/is designed without drilling.

14. The adapter sleeve of claim 13, wherein the body is produced via a three dimensional printing method.

15. The adapter sleeve of claim 13, wherein the three-dimensional printing method employs 1.2343 or 1.2344 metal powder.

16. A cutting device with an adapter sleeve according to claim 1.

17. The cutting device according to claim 16, wherein the cutting device has a seat section into which the adapter sleeve is inserted, wherein a length adjustment screw is provided that is coupled to the cutting device and adapter sleeve.

18. The cutting device according to claim 17, wherein the length adjustment screw is coupled to the inner thread in the axial rear of the body.

19. The cutting device according to claim 16, wherein the adapter sleeve, by a stop surface of the outlet element opposite the front end face, lies directly on a mating surface of the seat section.

20. The cutting device according to claim 19, wherein a seal ring is not present between the adapter sleeve and mating surface of the seat section.

\* \* \* \* \*